(12) United States Patent
Schmok

(10) Patent No.: US 8,961,328 B1
(45) Date of Patent: Feb. 24, 2015

(54) MULTIPLE LIGHT BEAM METHOD AND SYSTEM FOR GOLF SWING ALIGNMENT AND CALIBRATION

(71) Applicant: Robert Dean Schmok, Osoyoos (CA)

(72) Inventor: Robert Dean Schmok, Osoyoos (CA)

( * ) Notice: Subject to any disclaimer, the term of this patent is extended or adjusted under 35 U.S.C. 154(b) by 0 days.

(21) Appl. No.: 14/461,355

(22) Filed: Aug. 15, 2014

Related U.S. Application Data

(60) Provisional application No. 61/867,092, filed on Aug. 18, 2013.

(51) Int. Cl.
  *A63B 69/36* (2006.01)
  *A63B 24/00* (2006.01)
(52) U.S. Cl.
  CPC ......... *A63B 69/3614* (2013.01); *A63B 69/3632* (2013.01); *A63B 24/0003* (2013.01); *A63B 2220/20* (2013.01)
  USPC .......................................... 473/220; 473/409
(58) Field of Classification Search
  USPC ......... 473/219, 220, 221, 223, 226, 257, 266, 473/268, 275, 276, 409
  See application file for complete search history.

(56) References Cited

U.S. PATENT DOCUMENTS

| | | | |
|---|---|---|---|
| 2,080,608 A * | 5/1937 | Hannaford | 473/220 |
| 3,953,034 A | 4/1976 | Nelson | |
| 5,029,868 A | 7/1991 | Cloud | |
| 5,169,150 A | 12/1992 | Tindale | |
| 5,213,331 A | 5/1993 | Avanzini | |
| 5,388,832 A | 2/1995 | Hsu | |
| 5,435,562 A | 7/1995 | Stock | |
| 5,452,897 A | 9/1995 | Mick | |
| 5,470,072 A * | 11/1995 | Cunningham | 473/220 |
| 5,611,739 A | 3/1997 | Carney | |
| 5,709,609 A | 1/1998 | Carney | |
| 5,725,439 A | 3/1998 | Halsey | |
| 5,897,441 A * | 4/1999 | Apthorp | 473/220 |
| 6,059,668 A * | 5/2000 | Marley, Jr. | 473/220 |
| 6,066,052 A | 5/2000 | Li | |
| 6,371,864 B1 | 4/2002 | Norwood | |
| 6,383,087 B1 | 5/2002 | Moser | |
| 6,386,988 B1 * | 5/2002 | Shearer et al. | 473/220 |
| 6,767,291 B1 | 7/2004 | McCarthy | |
| 6,796,910 B1 | 9/2004 | Foster | |
| 6,921,340 B2 * | 7/2005 | Dickie | 473/220 |
| 7,160,198 B2 * | 1/2007 | Coates | 473/220 |

* cited by examiner

*Primary Examiner* — Nini Legesse

(57) ABSTRACT

An improved method and system for aligning and calibrating the swing of a golf club, specifically a putter, that uses multiple laser beam projections with markings on them, used in conjunction with an alignment and calibration guide laid on the ground for providing instant and continuous feedback to a golfer for the purpose of hitting a golf ball in a straight direction with a consistent and predictable distance.

17 Claims, 7 Drawing Sheets

MULTIPLE LIGHT BEAM METHOD AND SYSTEM FOR GOLF SWING ALIGNMENT AND CALIBRATION

FIELD OF INVENTION

This invention relates generally to a system for helping a golfer to achieve proper swing mechanics for consistently and predictably hitting a golf ball, and specifically to a multiple light beam device used in conjunction with an alignment and calibration guide that provides instant and continuous feedback before, during, and after a golf club swing, for the purpose of hitting a golf ball in a desired direction with desired strength to achieve a consistent and predictable direction and distance.

BACKGROUND OF INVENTION

Unless otherwise indicated herein, the materials described in this section are not prior art to the claims in this application and are not admitted to be prior art by inclusion in this section.

The game of golf requires a golfer to hit a golf ball as few times as possible with the goal of launching it from the tee ground, on to the putting green, and ultimately into the hole on the green. In order to do this effectively, the golfer must swing a golf club (and on the putting green a putter must be used) in a manner that projects the ball in the desired direction and with the desired distance. Golf instructors and golf instructional books all advise various techniques to teach golfers to swing their club (and the putter in the case of shots on the putting green) in a repeatable and consistent manner that projects the ball in the desired direction with the desired distance.

Numerous devices are known that attempt to assist a golfer in improving their alignment for addressing the golf ball. Such devices include visual aids that attach to the face of the golf club or to the shaft of the golf club. Each of the known devices is limited to providing directional information to a golfer before the swing takes place, but not effectively during the swing process. Further, the known prior art addresses only the directional aspect of the golf ball movement and not the travel distance aspect of the golf ball movement. Proper alignment of the golf club (or putter) to the golf ball, the alignment path of the golf club during the golf stroke through the impact point, and the length and force of a golfer's stroke will determine the direction and travel distance of a golf ball. Golfers practice swing techniques taught to them by golf instructors and golf instructional books and try to execute proper swings in a repeatable and consistent manner.

The applicant is unaware of a teaching aid that provides instant and continuous feedback to a golfer for the purposes of hitting a golf ball in a desired direction and a consistent and predictable distance. The result of this type of feedback will allow a golfer to make immediate adjustments to foot position, body position, club position, and golf club swing length to consistently project the ball in the desired direction with the desired distance.

SUMMARY OF THE INVENTION

In one aspect a multiple light beam system for alignment and distance calibration of a golf swing is provided. The system comprises a housing with a power source and at least two adjustable nozzles projecting from the housing. Each of the nozzles has a first end connected to the housing and a second end. The first end of the nozzles can rotate within the housing to adjust the position of each of the nozzles in relation to the housing. A light source in communication with the power source is provided to produce at least two light beams. A beam alignment system position in front of the light source is configured to direct the at least two light beams produced by the light source in the respective nozzles. The beam alignment system is configured to generate a target line and a distance calibration mark. The system further comprises an alignment and calibration guide that has a body with a top flat surface adapted to be placed on a ground. The alignment and calibration system comprises a light reflective central line formed centrally at the top surface along a longitudinal axis of the body and a middle mark formed at a pre-set position on the central line. During a training swing the target line is aligned with the central line of the alignment and calibration guide while the distance calibration mark is at a pre-set distance from the middle mark.

In another aspect an alignment and calibration guide is provided. The alignment and calibration guide comprises a body having a top flat surface and a bottom flat surface adapted to be laid down on a ground. A central line is formed centrally along a longitudinal axis of the body and a middle mark formed at a pre-set position at the central line. The central line is configured to reflect light when a light beam impinges upon it while the rest of the top surface is configured to at least partially absorb a light. The top surface further comprises a gloss varnish coating.

In yet another aspect a method for aligning and distance calibration of a golf swing is provided. The method comprises align the feet to be parallel to a projected target line, align the projected target line along a central line of an alignment and calibration guide, swing a golf club within a critical hitting zone of the alignment and calibration guide to check that a position of the golf club is being square to a swing path in the critical hitting zone, swing the golf club until a length of a backstroke is the same as a length of a through stroke, position a distance calibrating beam at a pre-set position in front of a middle mark of the alignment and calibration guide, swing the golf club back until the distance calibration beam aligns with the middle mark, position and hit a golf ball using a distance calibration parameters, and record a distance the ball travels using said distance calibration parameters in a data log.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

A multiple light beam projecting device 100 is disclosed that is attached to a shaft of a golf club to provide instant and continuous feedback to the user before, during, and after a golf club swing. The device can project multiple light beams onto a hitting surface on the ground where the golf ball is located. For example, the device 100 can project two light beams such as, two line projections, or a line projection and a spot/point projection. For example, one line projection can correspond to an intended target line of the ball's path and the other line projection or the spot projection can be used for calibrating distance of a backstroke and thus ball travel. Other embodiments can project more or fewer of two light beams, e.g. more or fewer of two line or spot projections without departing from the scope of the invention.

Figure 1:
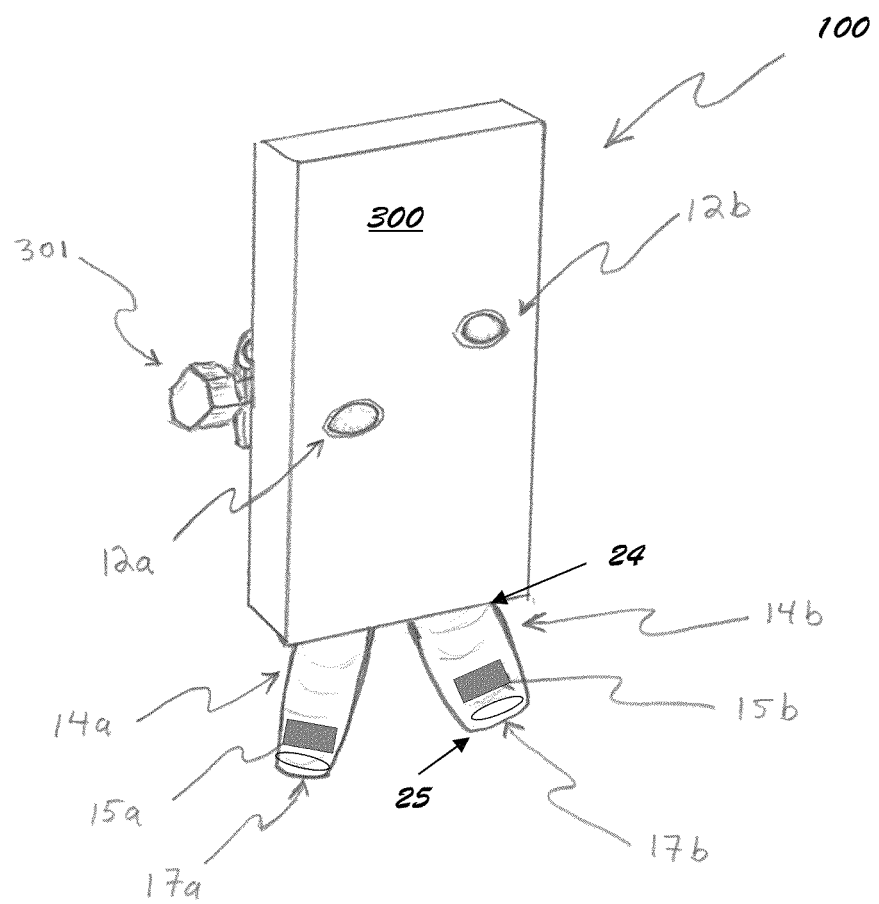
FIG. 1 is a perspective view of an example of a multiple light beam golf training device showing a housing with two nozzles and fastener to attach the housing to a shaft of a golf club.
Figure 2:
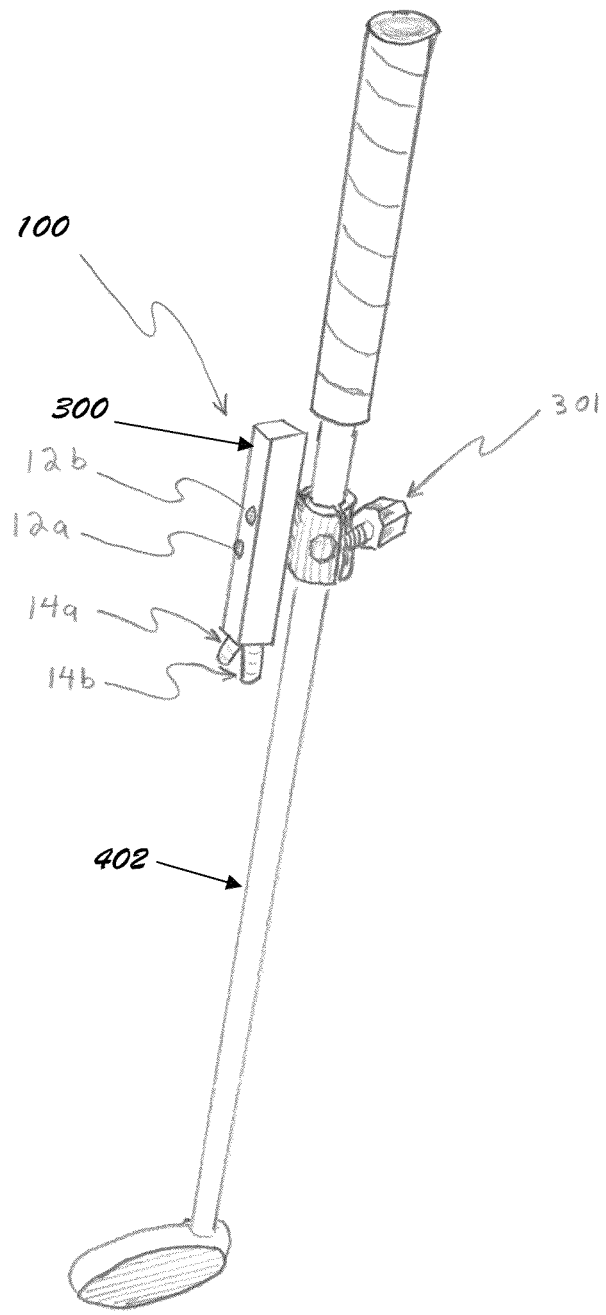
FIG. 2 is perspective view of the multiple light beam golf training device of FIG. 1 attached to a golf club.

Referring to FIG. 1, the multiple light beam projecting device 100 is provided comprising a housing 300, a plurality of adjustable nozzles 14 projecting from the housing 300 and a fastening means 301 to detachably connect the housing 300 to a golf club shaft 402 (see FIG. 2). FIG. 1 illustrates two nozzles 14a and 14b however, fewer or more nozzles can be provided without departing from the scope of the invention. The nozzles 14a, 14b have a first end 24 rotatably connected to the housing 300 and a second end 25. The housing 300 illustrated in FIG. 1 is a rectangular but it could be shaped in any other suitable form or shape adapted to be easily mounted on the golf club. The housing can be made of a plastic material or any other suitable light weighted material so that it does not add much weight to the golf club.

One or more light sources 15 can be provided to generate at least two light beams. One of the at least two light beams can be directed through the nozzle 14a while the other light beam can be directed through the nozzle 14b. For example the one or more light sources 15 can be lasers, light emitting diodes LED or any other suitable light source. The light sources 15 are configured to emit one or more light beams within a visible spectrum. In one implementation, one light source can be disposed at least partially within each of the nozzles 14 in proximity to the second end 25. For example, FIG. 1 illustrates two light sources 15a and 15b disposed at least partially within the respective nozzles 14a and 14b. The light sources 15a and 15b can be a laser, such as a laser diode emitting a very narrow coherent low-powered laser beam of visible light. The lasers 15a and 15b might be blue, green or red laser diodes. For example, the light source 15 can be a blue laser with a transmission wavelength of between about 400-500 nm, or green laser with a transmission wavelength of between about 500-600 nm, or a red laser with a transmission wavelength of between about 600-700 nm. In one implementation one of the lasers, e.g. laser 15a can be a green laser while the laser 15b can be a red laser. Any other combination of lasers can be used without departing from the scope of the invention. In another implementation, fewer or more than two nozzles 14 that include at least one light source 15 can be used to provide fewer or more than two light beams.

The device 100 can further comprise one or more beam alignment devices 17 mounted in front the light source 15 to direct the light beams generated by the light source 15 in the desired direction. In one implementation, the beam alignment devices 17 can be optical lens systems 17a and 17b mounted in front of the respective light sources 15a and 15b in the path of the light beams generated by the light sources 15a and 15b. The light beams produced by the light sources 15a and 15b can be transmitted and/or refracted by the lens systems 17a and 17b to create light line projections 200 (see FIG. 3). The light line projections 200 can be projected to a ground (e.g. golfing area) and can be visible to the naked eye even in daylight. For example, the optical lens systems 17a and 17b can comprise side by side clusters of lenses. Additionally or alternatively, the optical lens systems 17a and/or 17b can comprise beam splitter, mirror, apertures (e.g. for spot point line projections), slits, prisms, filters or any other suitable optical element. The optical lens systems 17a and/or 17b can be mounted mechanically at the second end 25 of the nozzles 14a, 14b or can be attached directly to the light source 15a, 15b in the path of the generated light beams. Person skilled in the art would understand that the device 100 can comprise one light source 15 configured to produce multiple beams without departing from the scope of the invention. For example, the light source can be disposed within the housing 300. The light source 15 can be configured to produce a light beam within the visible spectrum. Such light beam can pass through a beam splitter and/or multiple filters to produce at least two light beams which can be directed through the nozzles 14a and 14b.

The device 100 can further comprise one or more switches 12 in communication with the light source 15. The switches 12 can be configured as "on/off" switches to turn on and off the light source 15. FIG. 1 illustrates two switches 12a and 12b in communication with the respective light sources 15a and 15b. The switches 12a and 12b can be manually operated by the user. In one embodiment only one switch 12 can be adapted to switch at the same time both light sources 15a and 15b. In some implementations, the switches 12a, 12b can be configured to provide intermittent operations of the light sources 15a, 15b, such as for example repeating on-off cycles of varying durations for power saving.

FIG. 2 shows the multiple light beam device 100 attached to the shaft 402 of a golf club. In the illustrated example, the fastener 301 includes a clamp and bolt assembly to easily mount the housing 300 on the golf club. Any other fastener or combination of fasteners can be used to attach and/or detach the device 100 when not in use. The fastener 301 can be permanently connected to the housing 300 by for example welding, an adhesives or any other method for permanently attaching the fastener 301 to the housing 300. In one implementation, the fastener 301 can be detachably connected to the housing 300 by using for example some tongue and groove type fasteners. The housing 300 can be positioned on the shaft 402 so that it can face the user or can face away from the user depending whether the user is a right handed or left handed. Once, mounted on the shaft 402, the housing 300 can be rotated about the shaft 402 or adjusted up and down or back and front until it is in a position preferable by the user.

Additionally and alternatively the user may move/rotate the nozzles 14a, 14b in relation to the housing 300 or the golf club to adjust the position of the light beams generated by the light source 15a/15b and to align the line projections in the desired position/direction. For example, the nozzles 14 can comprise a plurality of bearings or any other mechanism to allow the nozzle 14 to be rotated around its longitudinal axis to adjust its position and thus the direction of the respective light beams generated by the source 15 and the beam alignment system 17. The position of the nozzles 14a, 14b can be adjusted manually by the user or can be controlled and driven electronically. For example, one or more joystick like buttons can be provided that are in communication with a controller and a driver to adjust the position of each of the nozzles 14.

Figure 3:
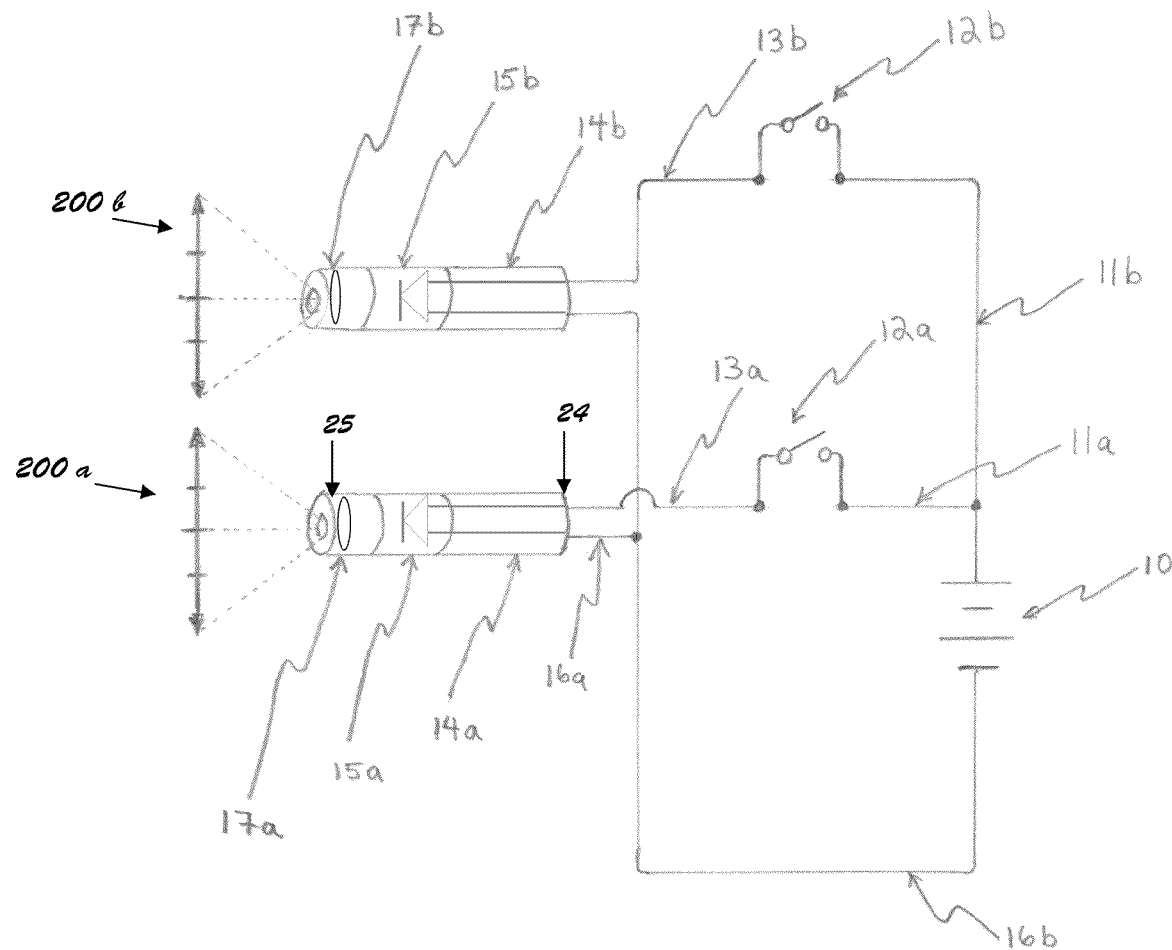
FIG. 3 is a schematic cross-sectional view of an example of a multiple light beam golf training device showing a power source, multiple light sources and switching and electrical components.

In one mode of operation, the user can press the buttons of the on/off switches 12a and 12b to energize the lasers 15a and 15b. FIG. 3 schematically illustrates an example of the electrical and the mechanical components housed within the housing 300. A power source 10 provides an electrical energy to the light sources 15a and 15b. The power source 10 can include one or more batteries. The adjustable nozzles 14a and 14b extend from the housing 300 and include the laser light sources 15a and 15b, which are connected to the optical lens systems 17a and 17b as stated herein before in connection with the description of FIG. 1. A positive terminal of a power source 10 is connected by way of conducting lines 11a and 11b to one terminal of the respective time on/off switches 12a and 12b. The other terminal of the switches 12a and 12b are connected by way of conducting lines 13a and 13b to a positive terminal of laser light sources 15a and 15b. A negative terminal of the power source 10 is connected by way of conducting lines 16a and 16b that are passing through the adjustable nozzles 14a and 14b to negative terminals of the laser light sources 15a and 15b. The housing 300 encloses the power source 10 and the conducting lines 13a, 13b, 16a and 16b and protects them from damage when adjustable nozzles 14a and 14b are re-positioned. FIG. 3 further illustrates the light projection lines 200a and 200b generated and projected by the respective light sources 15a, 15b and beam alignment systems 17a, 17b. In some implementations, the housing 300 can further comprise a control circuit to control the timing of the switches 12 and/or position/alignment of the nozzles 14, light sources 15 and the beam alignment systems 17.

Figure 4:
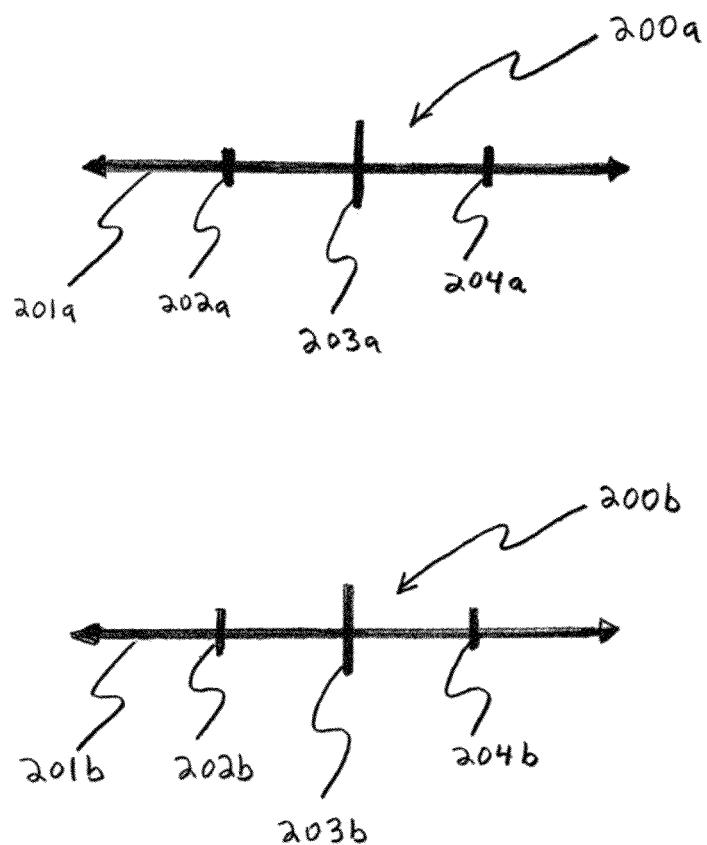
FIG. 4 is a schematic diagram of an example of a light beams line projections' layout.

FIG. 4 shows one example of the general layout of the light line projections 200. In the illustrated example there are two light beams 200a and 200b projected from the respective nozzles 14a, 14b generating target lines 201a and 201b used to indicate the desired travel path of the golf ball. The example of the target lines 201a and 201b illustrated in FIGS. 3 and 4 comprises measurement markings 202, 203 and 204 that can be formed by the optical lens system 17. The light beam produced by the light sources 15a and 15b can be refracted by the lens systems 17a and 17b to create line projections with measurement markings 202, 203 and 204. Center-marks 203a and 203b can be situated in the middle of the target-lines 201a and 201b. Front-measure-marks 202a and 202b can be situated in front of center-marks 203a and 203b on target-lines 201a and 201b, and rear-measure-marks 204a and 204b can be situated in the rear of center-marks 203a and 203b on target-lines 201a and 201b. The front marks 202 and the rear mark 204 can be positioned at substantially the same distance from the center mark 203. Each of the measuring marks 202, 203 and 204 can be used for distance calibration purposes. Thus, the target lines 201 with the measurement markings 202, 203, 204 on them give visual indications as to the golfer's alignment position to the golf ball and provide swing length calibration (distance calibration) information to the golfer. In one implementation, one of the line projections 201 can be used as a target line while the other can be used for distance calibration (i.e. its length can be used for swing length calibration. The light line projections on the ground may be rotated, and the golfer can adjust them so as to align the club strike face perpendicular to the desired travel direction of the golf ball. These visual aids assist the golfer to align his feet, body, and golf club to the correct position in order to execute a proper golf stroke.

In one implementation, the measurement markings can be omitted from the target lines 201, and target lines 201 with no markings can be projected on the ground. One of the light projections 200 can be a spot/point beam. In one embodiment such spot light beam can be a different color from the other line projection. For example, the spot beam can be red color while the line projection can be green color. Thus the green line can be the target line 201 while the red spot can be distance calibration beam. The position of the green target line 201 and the red spot beam can be adjusted by repositioning of the nozzles 14. This can allow the user to see a clear difference in the adjustment locations of each light source e.g. laser.

Figure 5:
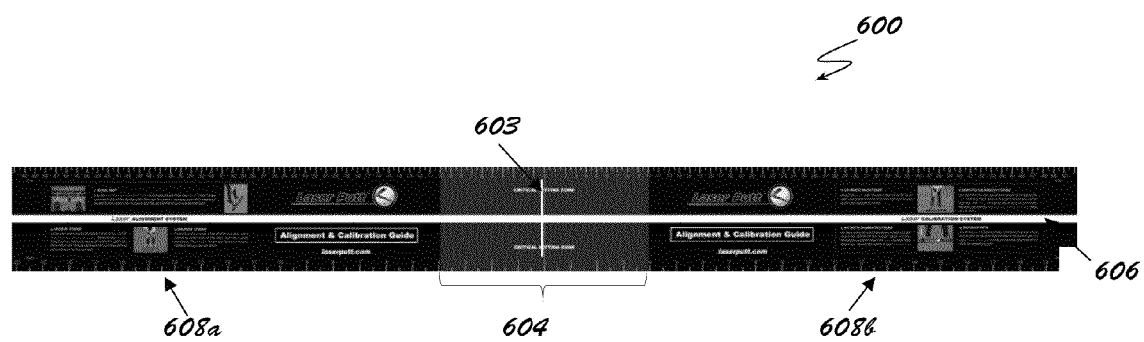
FIG. 5 is a perspective view of an example of an alignment and calibration guide.

Furthermore, an alignment and calibration guide 600 shown in FIG. 5 is provided that is laid on the ground to help the golfer with the positioning of the lasers as he aligns his club position in relation to the golf ball, and as he swings his club to make his golf shot. The alignment and calibration guide 600 comprises a clearly marked middle mark 603 and a marked critical hitting zone area 604. For example, the critical hitting zone area 604 can be approximately 4-inches behind and 4-inches in front of the middle mark 603. The user can use this as a visual aid to see the rotational and rectilinear motion of the light beams as he/she swings the golf club in the critical hitting zone 604. Additionally, the alignment and calibration guide 600 can be approximately 4-inches wide and 40-inches long so as to give the user a complete visual diagram for the positioning of the golf club and the light beam projections through the full range of the golf stroke. The primary color of the alignment and calibration guide 600 can a dark color which can absorb the light beams, such as a black colored, with a relatively more reflective, a lighter-colored (such as white) center line 606. The center line 606 can be, for example approximately ¼ inch wide and can run down the entire length of the alignment and calibration guide 600. The target line 201 can be strongly absorbed by the dark colors and won't be nearly as visible as when it is projected onto the light color of the central line 606. When the user swings the golf club with the multiple light beam projecting device 100, it becomes clearly apparent when the target line and the distance calibration beam are on top of the white center line 606 because they become very bright and noticeable. Conversely, when the light projections (e.g. target line, distance calibration beam) are not on top of the center line 606, rather they are on the black area of the alignment and calibration guide 600, they become absorbed into the black color and are not very bright or noticeable.

In one implementation, the alignment and calibration guide 600 can be made of a cloth or paper material that has a gloss varnish coating on it in order to enhance the visibility of the light beams. For example, when the target line 201 is projected down upon the gloss varnish coating of the alignment and calibration guide 600, its luminance is enhanced due to the reflective properties of the gloss varnish coating and becomes easily visible. This is an important feature because it allows users to practice with the multiple light beam projecting device 100 at any time of night or day, indoors or outdoors. The instant and continuous feedback the user gets by observing the target line 201 on the alignment and calibration guide 600 allow him/her to understand the precise shape of his/her stroke and to make any necessary modifications for improvement. The user can use this instant and continuous feedback to adjust his/her golf swing to keep the target line 201 in line with the center line 606 of the alignment and calibration guide 600 for as long as possible in order to groove a consistent and repeatable golf swing.

Additionally, the alignment and calibration guide 600 can be marked like a tape measure along its 40-inch long length with the middle mark 603 being the zero measurement mark (see FIG. 5). For example, the alignment and calibration guide 600 can have approximately 20 inches of measurement marks 608a going to the left direction and 20 inches of measurement marks 608b going to the right direction from the middle mark 603. In one embodiment, the measurement marks 608 can be in metric units. In another embodiment the alignment and calibration guide 600 can comprise two sets of measurements marks 608, one set in inches and one in metrics. The measurement marks 608a, 608b are used by the user to adjust the light beams to be at exact distances from the middle mark 603 of the alignment and calibration guide 600. When the user swings the golf club he/she can observe the position of the target line 201 in relation to the measurement marks 608. Thus, the user can be able to find out exactly how far he/she has swung the club back behind the ball, and exactly how far he/she has swung the club past the ball. The user can then record exactly how far he has hit the golf ball (record the distance), and can correlate this information about the distance with the observation of the exact length of his/her backstroke. The user can practice swinging the club at an exact backstroke length and hitting the golf balls the same exact distance so that his/her shots become consistent and repeatable. To further the skills, the user can then re-adjust the light beams to be at a different distance from the middle mark 603 of the alignment and calibration guide 600 which will result in a different backstroke length and a different distance. The user can thus record the results of the new "backstroke-to-distance" pairs and can practice until he/she becomes more skilled in hitting golf balls at a consistent and predictable distance. The measurement markings 202, 203, 204 of the target line projections 201 and marks 608 and the alignment and calibration guide 600 provide the user with exact calibration of the length of both the backstroke and the through stroke of the golf swing. The user can easily confirm that the backstroke and the through stroke are the same distance by simply looking at the measurement markings of the target projection 201 or alignment and calibration guide 600. This is particularly important when using a putter, and is said to be a balanced stroke. Additionally, by adjusting the length of the backstroke and the through stroke of the golf swing (particularly when using a putter), by looking at the measurement markings of the target line projection 201 and the alignment and calibration guide 600, the user can calibrate precisely how far he/she will hit the golf ball. This provides the user with an unprecedented aid in distance control (particularly when using a putter).

Figure 6:
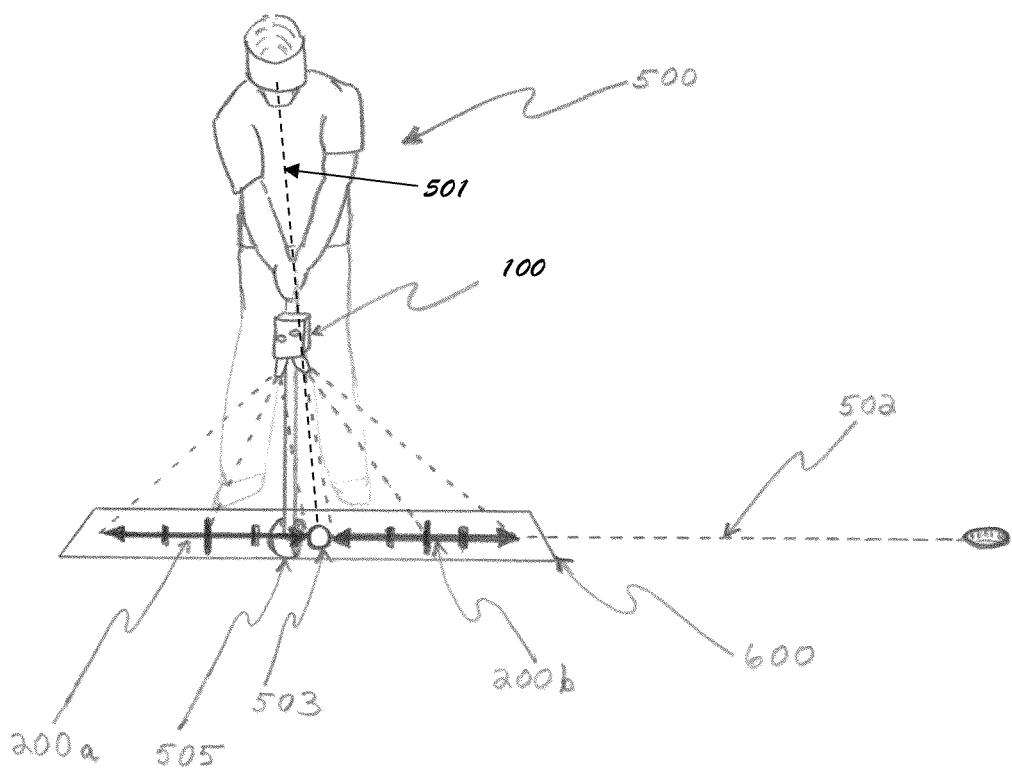
FIG. 6 is a perspective view of a user operating an example of a multiple light beam golf training device attached to a golf club and an alignment and calibration guide.

FIG. 6 illustrates one possible use of the multiple light beam device 100 and the alignment and calibration guide 600. The device 100 is attached to the golf club shaft 402 and the adjustable nozzles 14a and 14b, the light sources 15a and 15b, and the optical lens systems 17a and 17b are aligned with the longitudinal axis of the golf club shaft 402. The adjustable nozzles 14a and 14b are adjusted to allow the light sources 15a and 15b with optical lens system 17a and 17b to superimpose the line projections 200a and 200b on the golf ball 503 as it sits on the alignment and calibration guide 600. Further, the adjustable nozzles 14a and 14b can be twisted to rotate the optical lens systems 17a and 17b and the light sources 15a and 15b to position the center-marks 203a and 203b of the target lines 201a and 201b to align with the middle mark 603 of the alignment and calibration guide 600. The target-lines 201a and 201b are aligned to run straight down the center line 606 of the alignment and calibration guide 600 and the desired travel path 502 of the golf ball 503. A golfer 500 can arrange his/her feet in a preferential alignment in order to strike the golf ball 503. He/she can observe and adjust his/her feet in relation to front measure marks 202a and 202b, center marks 203a and 203b, and rear measure marks 204a and 204b of target lines 201a and 201b. In one implementation, the user 500 can adjust his/her position using the alignment and calibration guide 600 as a reference point (to preferential distance from the alignment and calibration guide 600), so that he/she can easily remember and repeat the foot position alignment at future practice sessions. The user 500 can grip the golf club shaft 402, adjust the shoulder, hips, and legs to place the strike face of the golf club head 505 perpendicular to target-lines 201a and 201b and in alignment with the center marks 203a and 203b and the alignment and calibration guide 600. Thereafter, the user 500 can fix a line of sight 501 on the golf ball 503 and thus complete a pre-shot alignment. Once the user 500 aligns his/her position and aligns the target line 201 along the center line 606 of the alignment and calibration guide 600, he/she can start his/her golf swing by moving the golf club shaft 402 back behind the golf ball 503. By observing the position of the front measure marks 202a and 202b in relation to the golf ball 503 and in relation to the alignment and calibration guide 600, the golfer can determine the exact length of his backstroke. The golfer 500 will then proceed to swing the striking face of the golf club head 505 so that it strikes the golf ball 503. The golfer 500 will plainly see the visual path of the target-lines 201a and 201b on the alignment and calibration guide 600 as the golf club head 505 strikes the golf ball 503. Further, by observing the position of the rear-measure-mark 204 on the alignment and calibration guide 600 in relation to the starting position of the golf ball 503, the golfer can see the exact length of his through stroke. Through a process of trial and repetition, the golfer 500 will systematically build up personal data on how far he/she moves the golf club shaft 402, and correspondingly the front-measure-marks 202a and 202b in relation to the alignment and calibration guide 600 and the golf ball 503, so that the length of the backstroke can result in a predictable and consistent distance of the golf ball 503 upon being struck by the golf club head 505. Similarly, through this process of trial and repetition, the golfer 500 can systematically build up personal data on the motion of the visual path of target-lines 201a and 201b on the alignment and calibration guide 600 as the golf club head 505 strikes the golf ball, so that he/she can learn to strike the golf ball 503 in a predictable and consistent direction. Additionally, through the process of trial and repetition, the golfer 500 can systematically build up personal data on the position of rear-measure-marks 204a and 204b in relation to the alignment and calibration guide 600 and the starting position of the golf ball 503, so that the golfer can determine the exact length of his/her through stroke and thus learn to carry out an optimum balanced stroke. The golfer 500 is thereby aided in improving his/her golfing skills. Furthermore, by monitoring and analyzing the path of the movement of the target lines 201a and 201b on the alignment and calibration guide 600, with particular attention to the critical hitting zone 604 and the center line 606 of the alignment and calibration guide 600, and the swing path of the golf club head 505, the golfer 500 can learn to swing the golf club in a consistent and predictable manner. The golfer 500 is thereby aided in improving his/her golfing skills.

Figure 7:
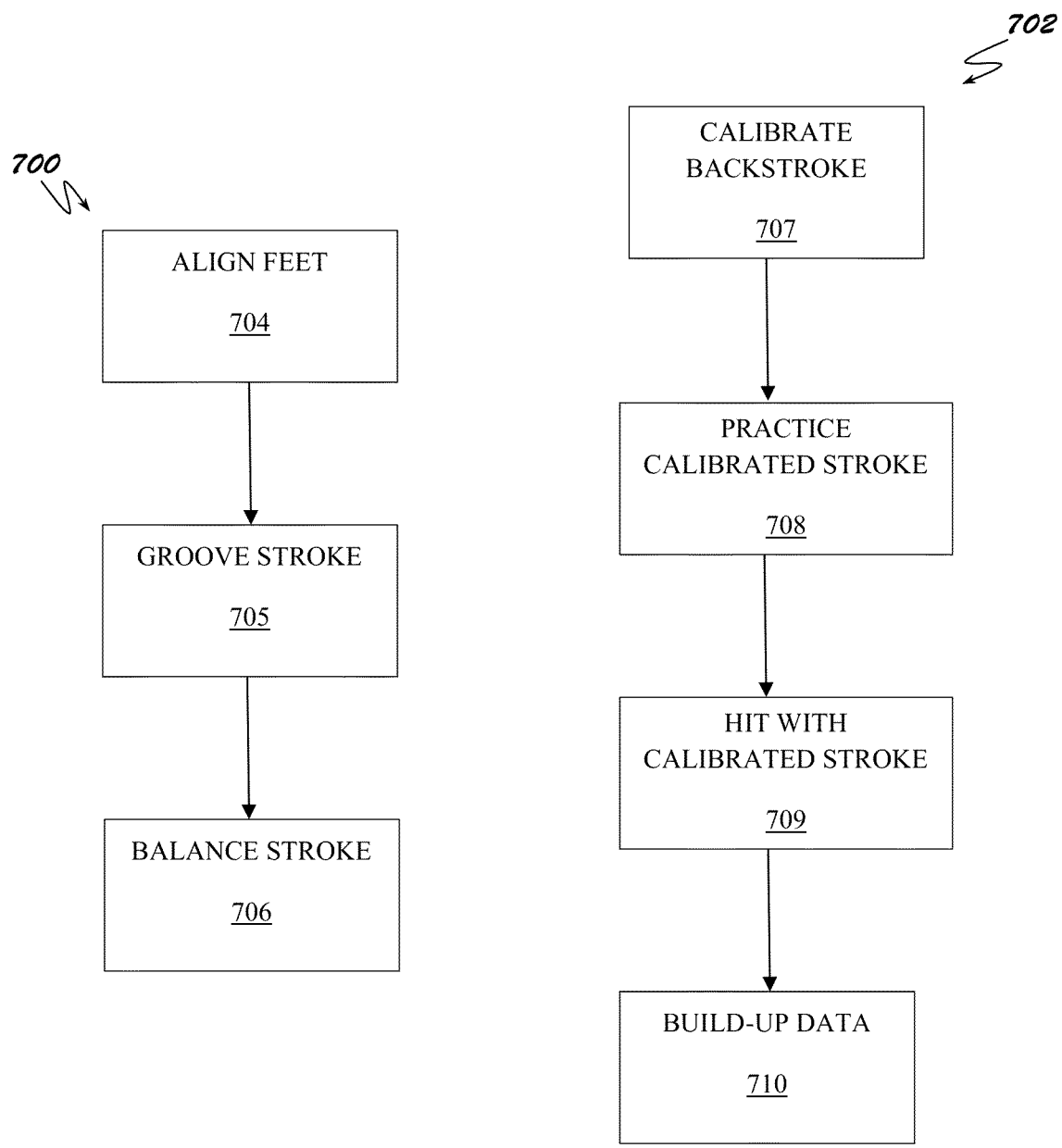
FIG. 7 is a flowchart illustrating an example of a method for providing an instant and continuous feedback to a user before, during, and after a golf club swing.

FIG. 7 illustrates a method of light alignment system 700 and distance calibration method 702 for a golf training purposes. At block 704, the method 700 comprises alignment of user's feet. The alignment and calibration guide 600 is laid on the ground and the target line 201 is aligned along the central line 606. Then, the golf club (or putter) is pulled towards the feet keeping the target line 201 parallel to the central line 606 to ensure that the feet are parallel with the intended ball path. If the feet are not in the proper position the user re-adjust the position and the process is repeated until the feet are aligned in the desired position. The method 700 further comprises a groove stroke step at block 705 that includes swinging the golf club (or putter) down the center line 606 and observing the target line 201 to make sure that the stroke is on-line within the critical hitting zone 604. At block 706 the method 700 comprises balance stroke by checking that the stroke is the same length on both sides of the ball (balanced), just like a clock pendulum looking at the target line 201 that acts as a visual pendulum.

The distance calibration method 702 comprises a calibration of a backstroke (block 707) by for example adjusting a red spot light (or target line 201*b*) to shine at an exact backstroke distance from the front face of the club (putter). This can be done by for example adjusting the position of the nozzle 14*b*. Then the user can practice the calibrated stroke at block 708 to get the feel for the backstroke length by bringing the red distance spot beam (or mark 202*b*) to exact point where the club (or putter) face started (e.g. middle mark 603). The red distance mark can act as a visual tape measure and the alignment and calibration guide can help to check and provide feedback. At block 709 the method 702 can include hitting the balls with the practiced calibrated stroke length and observe the actual apex of the backstroke (the point to where the distance mark moves to) and record the distance the ball travel in a data log. Then, at block 710 the user can pre-set the distance mark at different length (apex) and can mark the results for several backstroke-to-distance pairs in the data log. By using this method the user can develop a skill about the relationship between the distance, pace and speed of hitting golf balls.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A multiple light beam system for alignment and distance calibration of a golf swing, the system comprising:
   a housing having a power source;
   at least two adjustable nozzles projecting from the housing, each of the nozzles having a first end connected to the housing and a second end, each of the nozzles configured to adjusts its position in relation to the housing;
   a light source in communication with the power source and configured to produce at least two light beams; and
   a beam alignment system positioned in front of the light source to direct the light beams to corresponding nozzles, the beam alignment system configured to generate a target line and a distance calibration mark; and
   an alignment and calibration guide having a body with a top surface adapted to be placed on a ground, the alignment and calibration guide comprising a light reflective central line formed centrally at the top surface along a longitudinal axis of the body and a middle mark formed at a pre-set position on the central line,
   wherein during a training swing the target line is aligned with the central line and the distance calibration mark is at a pre-set distance from the middle mark.

2. The multiple light beam system of claim 1, wherein the light source includes one or more laser diodes.

3. The multiple light beam system of claim 2, wherein the laser diode is selected from the group of blue, green or red diode.

4. The multiple light beam system of claim 3, wherein the laser diodes are different colored laser diodes.

5. The multiple light beam system of claim 1, wherein the light source includes one or more LEDs.

6. The multiple light beam system of claim 1, wherein the distance calibration mark is a spot light beam.

7. The multiple light beam system of claim 1, wherein the beam alignment system is an optical lens system.

8. The multiple light beam system of claim 7, wherein the target line comprises a center measure mark, a front measure mark and a rear measure mark positioned as cross line at the target line, the optical lens system being configured to form the center measure mark, the front measure mark and the rear measure mark on the target line.

9. The multiple light beam system of claim 8, wherein the distance calibration mark is selected from the front measure mark, center measure mark and the rear measure mark.

10. The multiple light beam system of claim 1, wherein the first end of the nozzles is rotatable within the housing to adjust the position of each of the nozzles and to enable horizontal and vertical adjustment of the target line and the distance calibration mark.

11. The multiple light beam system of claim 1, wherein the housing further comprises a fastener to detachably mount the housing to a golf club.

12. The multiple light beam system of claim 1, wherein the power source comprises one or more rechargeable battery.

13. The multiple light beam system of claim 1, further comprising one or more switches to provide power to the light source from the power source.

14. The multiple light beam system of claim 1, wherein the alignment and calibration guide further comprises a gloss varnish coating on its top surface.

15. The multiple light beam system of claim 1, wherein the alignment and calibration guide further comprises a plurality of measurement markings positioned left and right from the middle mark.

16. The multiple light beam system of claim 1, wherein the alignment and calibration guide further comprises a critical hitting zone position at a predetermined distance left and right from the middle mark.

17. A method for aligning and distance calibration of a golf swing, the method comprising:
  align feet to be parallel to a target line;
  align a projected light target line along a central line of an alignment and calibration guide;
  swing a golf club within a critical hitting zone of the alignment and calibration guide to check that a position of the golf club is being square to a swing path in the critical hitting zone;
  swing the golf club until a length of a backstroke is the same as a length of a through stroke;
  position a distance calibrating beam at a pre-set position in front of a middle mark of the alignment and calibration guide;
  swing the golf club back until the distance calibration beam aligns with the middle mark;
  position and hit a golf ball using a distance calibration parameters; and
  record a distance the ball travels using said distance calibration parameters in a data log.

\* \* \* \* \*